US011265217B2

(12) United States Patent
Easwar Prasad et al.

(10) Patent No.: US 11,265,217 B2
(45) Date of Patent: Mar. 1, 2022

(54) DISTRIBUTED LEDGER FOR CONFIGURATION SYNCHRONIZATION ACROSS GROUPS OF NETWORK DEVICES

(71) Applicant: HEWLETT PACKARD ENTERPRISE DEVELOPMENT LP, Houston, TX (US)

(72) Inventors: Ananth Narayanan Easwar Prasad, Bangalore (IN); Fazlur Rahman Sit Mohamed Ali, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 22 days.

(21) Appl. No.: 16/427,239

(22) Filed: May 30, 2019

(65) Prior Publication Data

US 2020/0382372 A1 Dec. 3, 2020

(51) Int. Cl.
*G06F 15/16* (2006.01)
*H04L 41/0853* (2022.01)
*H04L 29/06* (2006.01)
*H04L 41/0813* (2022.01)
*H04L 67/10* (2022.01)

(52) U.S. Cl.
CPC ...... *H04L 41/0853* (2013.01); *H04L 41/0813* (2013.01); *H04L 63/0435* (2013.01); *H04L 67/10* (2013.01)

(58) Field of Classification Search
CPC ............. H04L 41/0853; H04L 41/0813; H04L 63/0435; H04L 67/10; H04L 41/0866; H04L 41/0803

(Continued)

(56) References Cited

U.S. PATENT DOCUMENTS

2017/0031676 A1 2/2017 Cecchetti et al.
2018/0343175 A1 11/2018 Bathen et al.
(Continued)

FOREIGN PATENT DOCUMENTS

WO WO 2019/018282 A1 * 1/2019

OTHER PUBLICATIONS

B. Chen, Z. Tan and W. Fang, "Blockchain-Based Implementation for Financial Product Management," 2018 28th International Telecommunication Networks and Applications Conference (ITNAC), 2018, pp. 1-3 (Year: 2018).*

(Continued)

*Primary Examiner* — Oscar A Louie
*Assistant Examiner* — Messeret F Gebre
(74) *Attorney, Agent, or Firm* — Sheppard Mullin Richter & Hampton LLP

(57) ABSTRACT

Some implementations of the disclosure are directed to receiving over a distributed ledger network, at an edge network device, a network configuration update transaction, the network configuration update transaction including an update to a configuration of a network device group including a plurality of network devices, where the edge network device is communicatively coupled to one or more of the plurality of network devices; validating, at the edge network device, that the transaction was sent by a cloud-based networking management platform that manages configurations of network devices that are members of the network device group; and after validating the transaction, updating at the edge network device a local copy of a distributed ledger associated with the distributed ledger network to include the update to the network device group configuration.

20 Claims, 5 Drawing Sheets

(58) Field of Classification Search
USPC .......................................................... 709/223
See application file for complete search history.

(56) References Cited

U.S. PATENT DOCUMENTS

| | | | |
|---|---|---|---|
| 2019/0123580 A1* | 4/2019 | Bindea | G05B 13/026 |
| 2019/0372834 A1* | 12/2019 | Patil | H04W 8/04 |
| 2020/0044918 A1* | 2/2020 | Byers | G06F 16/182 |
| 2020/0125738 A1* | 4/2020 | Mahatwo | H04L 63/20 |
| 2020/0137176 A1* | 4/2020 | Todd | H04L 63/10 |
| 2020/0252213 A1* | 8/2020 | Vijayan | H04L 9/32 |

OTHER PUBLICATIONS

Cong, N. T., Schimpe, M., Bürger, U., Hesse, H. C., & Jossen, A. (2018). Multi-use of stationary battery storage systems with blockchain based markets. Energy Procedia, 155, 3-16. (Year: 2018).*

J. Weng, J. Weng, Y. Zhang, W. Luo and W. Lan, "BENBI: Scalable and Dynamic Access Control on the Northbound Interface of SDN-Based VANET," in IEEE Transactions on Vehicular Technology, vol. 68, No. 1, pp. 822-831, Jan. 2019 (Year: 2019).*

S. Raju, S. Boddepalli, S. Gampa, Q. Yan and J. S. Deogun, "Identity management using blockchain for cognitive cellular networks," 2017 IEEE International Conference on Communications (ICC), 2017, pp. 1-6 (Year: 2017).*

Clustering Nodes for High Availability, (Web Page), Retrieved Dec. 31, 2018, 3 Pgs.

Cole, Z., How Blockchain Technology Could Affect the Future of Network Engineering, (Web Page), Nov. 9, 2017, 4 Pgs.

Gonsalves, A., Cisco Says Blockchain Ledger Technology Has Networking Role, (Web Page), Aug. 1, 2017, 5 Pgs.

Suderman, S., Can Blockchain Improve Network Management, (Web Page), Retrieved Dec. 31, 2018, 8 Pgs.

* cited by examiner

DISTRIBUTED LEDGER FOR CONFIGURATION SYNCHRONIZATION ACROSS GROUPS OF NETWORK DEVICES

DESCRIPTION OF RELATED ART

A network deployment at an enterprise site may include many wireless access points. It may be desirable to provide wireless network services in all areas of enterprise sites such as office complexes, university campuses, hospitals, airports, shopping areas, and the like. Providing wireless network coverage to such large areas may require hundreds or possibly thousands of wireless access points. During the initial deployment of the network, these access points may need to be configured, for example, to apply network identifiers, security settings, and other parameters that may be desired for the deployment site. After initial deployment, some or all of the access points may need to be re-configured, to apply updated or changed settings. Configuration and re-configuration also may occur when one or more new access points are added to an already established network.

Some enterprise network topologies utilize access points (APs) to communicate individually to a centralized cloud-based controller that pushes configurations downstream into the AP devices. In implementations where multiple locations need to enforce the same configurations and policies, the centralized cloud-based controller may be utilized as a single point of configuration of all devices. For example, the cloud-based controller may be utilized to push new AP group configurations to APs located in one or more sites.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

Figure 1:
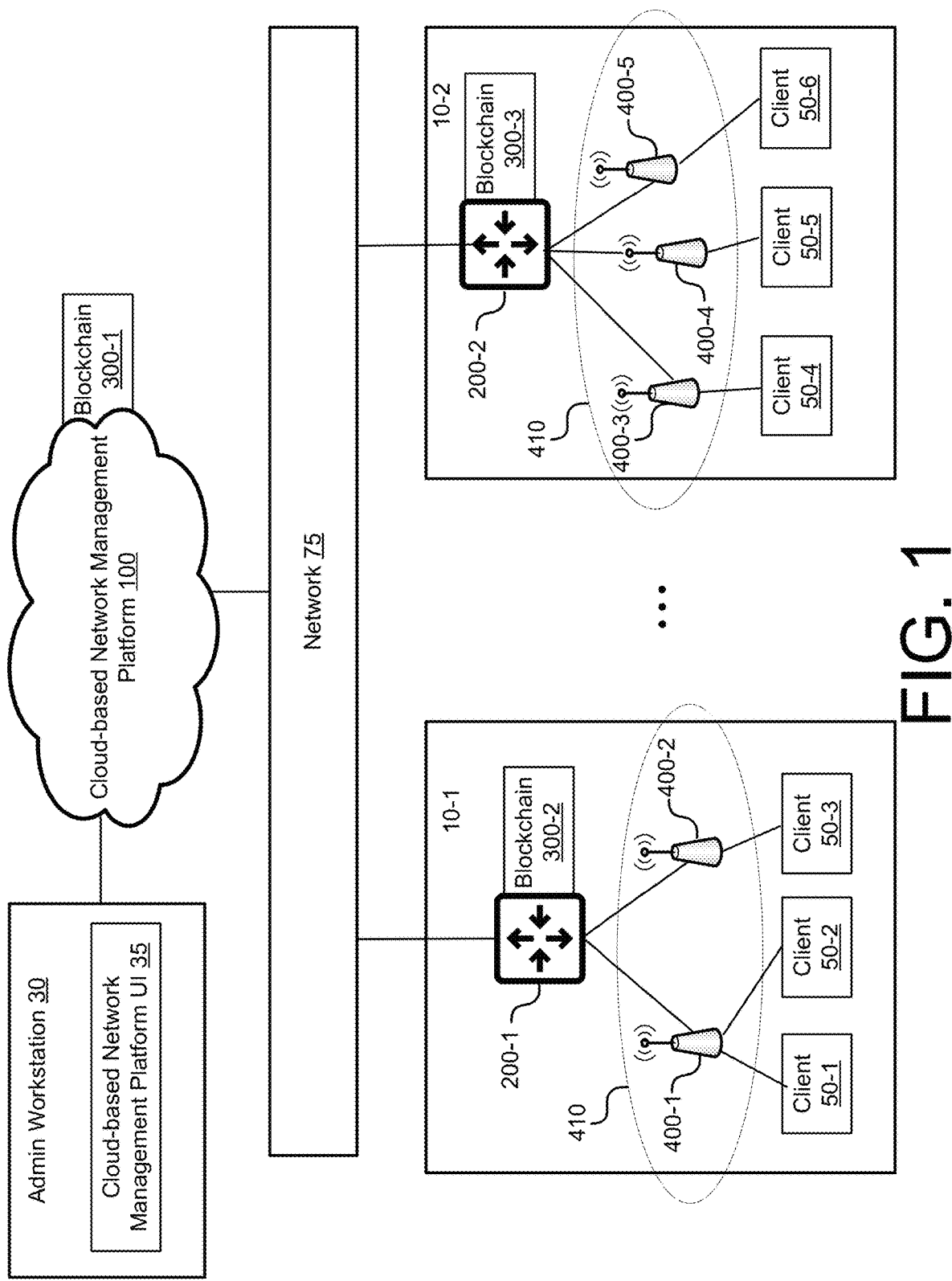
FIG. 1 illustrates an example networking system in which the disclosure may be implemented.

The figures are not intended to be exhaustive or to limit various embodiments to the precise form disclosed. It should be understood that various embodiments can be practiced with modification and alteration.

DETAILED DESCRIPTION

As used herein, the term "distributed ledger" generally refers to a shared digital ledger that is decentralized and shared between nodes distributed across a network. After a transaction that is approved to be written to the ledger is consented by at least the majority of the nodes, the contents of the ledger are synchronized across all the nodes. Different types of consensus mechanisms that bring in varying levels of processing requirements to agree on a transaction amongst distributed nodes may be utilized in a distributed ledger network. Examples of common consensus mechanisms include proof of work, proof of stake, proof of elapsed time, Kafka, etc. Various platforms have adopted different consensus mechanisms.

Distributed ledger technology (DLT) describes the superset of the different variations of this technology. One presently popular type of DLT is blockchain technology. While in a distributed ledger a transaction is written to the ledger after consensus, the requirement is more specific in a blockchain: transactions are aggregated in to a block and the block is appended to the last block of an existing linear chain of blocks. As such, all blockchains are a form of a distributed ledger, but all distributed ledgers are not necessarily a blockchain. BITCOIN and ETHEREUM are examples of blockchain-based platforms. Directed acyclic graphs (DAG) are another example of a common form of DLT. IOTA is an example of a DAG-based platform. HYPERLEDGER is an example of a DLT-based platform. Unless explicitly stated otherwise, implementations of the disclosure may apply to any variant of DLT, including blockchains, DAGs, etc., in a public, private, and/or hybrid networking environment.

Although embodiments of the disclosure will be primarily described in the context of blockchains, it should be appreciated that all embodiments, unless expressly stated otherwise, may be applied to other variants of distributed ledger technology. For example, to the extent an embodiment is described in the context of a blockchain network sharing a blockchain, it should be appreciated that the embodiment may more generally be applied in a distributed ledger network sharing a distributed ledger. Similarly, to the extent that an embodiment recites a "blockchain address," "a blockchain application," or "a blockchain transaction," it should be appreciated that the embodiment may more generally be applied using a "distributed ledger address," "a distributed ledger application," and/or "a distributed ledger transaction."

As used herein, the term "public blockchain" generally refers to a blockchain that is accessible to any entity and whereby any entity may participate in the consensus process. A public blockchain may be referred to as a "fully decentralized" blockchain.

As used herein, the term "private blockchain" generally refers to a blockchain where a limited set of trusted entities participate in a blockchain network. A permissioned set of trusted nodes may participate in the consensus process. For example, a set of site controllers or edge servers of an enterprise may form a private blockchain network. The right to read a private blockchain may be public or restricted to trusted nodes. A private blockchain may be referred to as a permissioned blockchain. Although implementations of the disclosure will primarily be described in the context of private blockchains, it should be appreciated that the technology disclosed herein may be adapted for use in anything from public to private blockchains.

As used herein, the term "blockchain address" refers to an identifier for a receiver or a sender in a blockchain recorded transaction. For example, a unique blockchain addresses may be associated with a client.

As noted above, some implementations of enterprise networking topologies rely on a centralized cloud-based controller to push AP configuration changes, including AP group configuration changes, to AP devices. In such implementations, because a centralized controller may be used to push AP configuration changes to different sites (e.g., different branch offices), a configuration synchronization problem for APs in the same AP group may occur in the unusual instance in which the centralized controller experiences connectivity issues. Particularly, consider the corner case where a centralized controller updates a configuration setting for a given AP group, pushes that updated configuration setting to a first branch office having APs in the AP group, but then goes down due to connectivity issues before the updated configuration setting is pushed to a second branch office having APs in the AP group. In such a scenario, the AP group settings will not be synchronized between the APs of the first and second branch offices. While APs of the first branch office will have the latest configuration settings, APs of the second branch office will not have the latest configuration settings. This lack of synchronization is undesirable and may cause security holes as APs in the same AP Group are supposed to have the same configuration and enforce the same rules and policies.

Implementations of the disclosure are directed to addressing this and other problems in networking systems that rely on a centralized cloud-based controller for pushing network configuration updates to different sites. Particularly, implementations described herein are directed to leveraging a blockchain network, including distributed blockchain network nodes located at each site, to achieve networking configuration synchronization.

In accordance with implementations described herein, blockchain nodes may be provided at each site having APs belonging to an AP group. Each blockchain node may store and update a respective copy of a blockchain that includes network configuration settings pertaining to the AP group. During normal operation, a centralized cloud-based platform may push configuration changes to the APs of each site. However, in the case of communication loss between the centralized cloud-based platform and the APs, the data in the blockchain may provide a failover mechanism for obtaining a network configuration, including an AP group configuration. For example, having a local blockchain node on a campus may ensure failover and high availability for the centralized platform. The blockchain may also give traceability to network configuration changes that were made over time. By virtue of integrating a blockchain with a cloud-based controller, APs may be provided with tamper-proof, highly available, and synchronized configurations. Additionally, they may be provided with a time history of AP configuration changes.

FIG. 1 illustrates an example networking system in which the disclosure may be implemented. The networking system of FIG. 1 may correspond to a multi-user organization, such as a business, educational institution, governmental entity, or any other organization having multiple users and multiple networking sites 10-1 and 10-2 (individually referred to as "a networking site 10" and collectively referred to as "networking sites 10"). Although two networking sites 10 are illustrated in this example, it should be appreciated that more than two networking sites 10 may be present. In some implementations, the multiple networking sites may form a wide area network (WAN).

The networking sites 10-1 and 10-2 may be geographically or physically separated. For example, one networking site 10 may correspond to a first office in a first city, and a second networking site 10 may correspond to a second office in a second city. In some implementations, one of the networking sites 10 may correspond to a headquarters or main office of the organization while the other networking sites may correspond to remote sites or branch offices of the organization.

In various embodiments, each of the sites 10 may include one or more edge devices 200 for communicating with the network 75 and a wireless access point 400, by which various client devices 50 access the network. Such a site 10 may also be in communication with another site 10, such that the client devices 50 located at one site may access network resources from another site. The network 75 may be a public network, such as the Internet. A public network is a network that may be shared by any number of entities, including the illustrated network configuration. A public network may have unrestricted access, such that any user may connect to it. The network 75 may include third-party telecommunication lines, such as phone lines, broadcast coaxial cable, fiber optic cables, satellite communications, cellular communications, and the like. The network 75 may include any number of intermediate network devices, such as switches, routers, gateways, servers, and/or controllers, that are not directly part of the illustrated network configuration but that facilitate communication between the various parts of the network configuration, and between the network configuration and other network-connected entities.

In this example environment, cloud-based network management platform 100 may be configured to provide management services for the networking system. Particularly, platform may include various software processes for configuring and/or managing network devices at networking sites 10-1 and 10-2 (individually referred to as networking site 10). Management tasks may include, for example, access, authentication, security, hardware management, and/or internal and/or external communication. The platform 100 may be operable to configure and/or manage switches, routers, access points, and/or client devices connected to a network.

Platform 100 may provide a cloud-based network management platform user interface (UI) 35 (e.g., a web-based interface) that allows a network administrator to access platform 100 using workstation 30 and configure and monitor the devices of the networking system.

Wireless access points 400-1 to 400-5 (individually referred to as an "AP 400" and collectively referred to as "APs 400") may provide network connectivity to various client devices 50. Using a connection to an AP 400, a client device 50 may access network resources, including other devices on the network and the network 10. Examples of client devices 50 include, but are not limited to: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, netbook computers, televisions and similar monitors, content receivers, set-top boxes, personal digital assistants (PDAs), mobile phones, smart phones, smart terminals, dumb terminals, virtual terminals, video game consoles, printers, and the like.

In this example environment, cloud-based network management platform 100 is configured to maintain configuration settings for APs 400. For example, platform 100 may be configured to provision an AP 400 by providing it with configuration settings, including network identifiers, such as security set identifiers (SSIDs) that are used by one or more client devices 50 to identify and connect to a network. Other example configuration settings for APs 400 that may be maintained by platform 100 may include security settings, such as firewalls and/or passwords, and radio settings, such as transmission power, channels, and/or Multiple-Input and Multiple Output (MIMO) capability.

The settings from the cloud-based network management platform 100 may be pushed to the APs, for example, by using APIs (Application Programming Interfaces). The network administrator (e.g., using UI 35) may choose certain configurations to implement, and an API in platform 100 may translate this data into commands that are sent to the AP, which updates itself with the pushed configurations, using its own API to do the conversion. Configurations from the platform 100 may be read by the AP using a "Southbound" API and data from the AP may be sent up to the platform 100 using a "Northbound" API.

AP groups may be used to group APs with the same configuration. For example, a virtual AP may be created for each SSID in an organization, and then virtual APs, an AP system profile, an IDS profile, and port configurations may be assigned to each AP Group. For example, a group of access points may provide wireless network service for the work area of an office, while a different group of access points provide coverage for the conference room area, while yet another group provides coverage for an auditorium area. Each of these areas may have different configurations. For example, the work area may have high security settings, while the conference room may have low security settings but more limited network access. Each group of access points may be given a name that a network administrator may use to identify the group. For example, the groups in the prior example may be named "work_area", "conference_rooms" and "auditorium."

While an AP group may be used to apply a configuration parameter to a set of APs, in some implementations a configuration parameter may be configured for a specific AP that is part of an AP group. For example, any options or values that are configured for the specific AP may override the same options or values configured for the AP group to which the AP belongs.

In some implementations, APs that are part of the same AP group may be located in different sites. This scenario is illustrated by FIG. 1, which shows APs 400-1 and 400-2 of site 10-1 as belonging to AP group 410, and APs 400-3, 400-4, and 400-5 of site 10-2 as also belonging to AP group 410. Although the APs in each of these two sites should maintain the same AP group configuration settings during operation, there is the potential for a synchronization issue occurring between the APs of the two sites if the cloud-based network platform 100 goes down before pushing AP group configuration updates to both sites.

To address this problem, platform 100 and edge devices 200 may be configured as a blockchain network of nodes that maintain a respective copy of a blockchain 300-1, 300-2, and 300-3 (individually referred to as a blockchain 300). The blockchain 300 may protect the configuration data inside it from corruption and act as a trustworthy source of network configurations, including AP group configurations. In implementations, the APs 400 that have continued access to the cloud-based network management platform may receive configuration settings from platform 100. In the case that the communication link between platform 100 and an AP fails for some reason, the network configuration settings, including the AP group configuration settings, may be retrieved from the blockchain node (e.g., edge device 200) that is running on the site. In other implementations, the configuration may be retrieved from another node over the Internet (e.g., an edge device 200 in another site). In implementations, the edge device 200 may be a gateway, an edge server, or an AP located at a particular site. As such, any one of a gateway, edge server, or AP may act as a blockchain node. In some implementations, a site may have multiple edge devices that act as blockchain nodes.

In various implementations, the blockchain 300 may be a permissioned blockchain. For example, during initialization, access to the blockchain may be provided to a permissioned set of users such as network administrators of the enterprise corresponding to sites 10. The permissioned set of users may each be respectively assigned a private key to write transactions to the blockchain. In such instances, only the permissioned users may read the blockchain (e.g., read the record of permissions), write transactions to the blockchain, and/or participate in a consensus mechanism for verifying transactions that are written to the blockchain. In particular implementations, the blockchain network is a permissioned blockchain network whereby only transactions that are digitally signed by platform 100 (e.g., using private key 310 depicted in FIG. 2) are used to update the blockchain 300.

Figure 2:
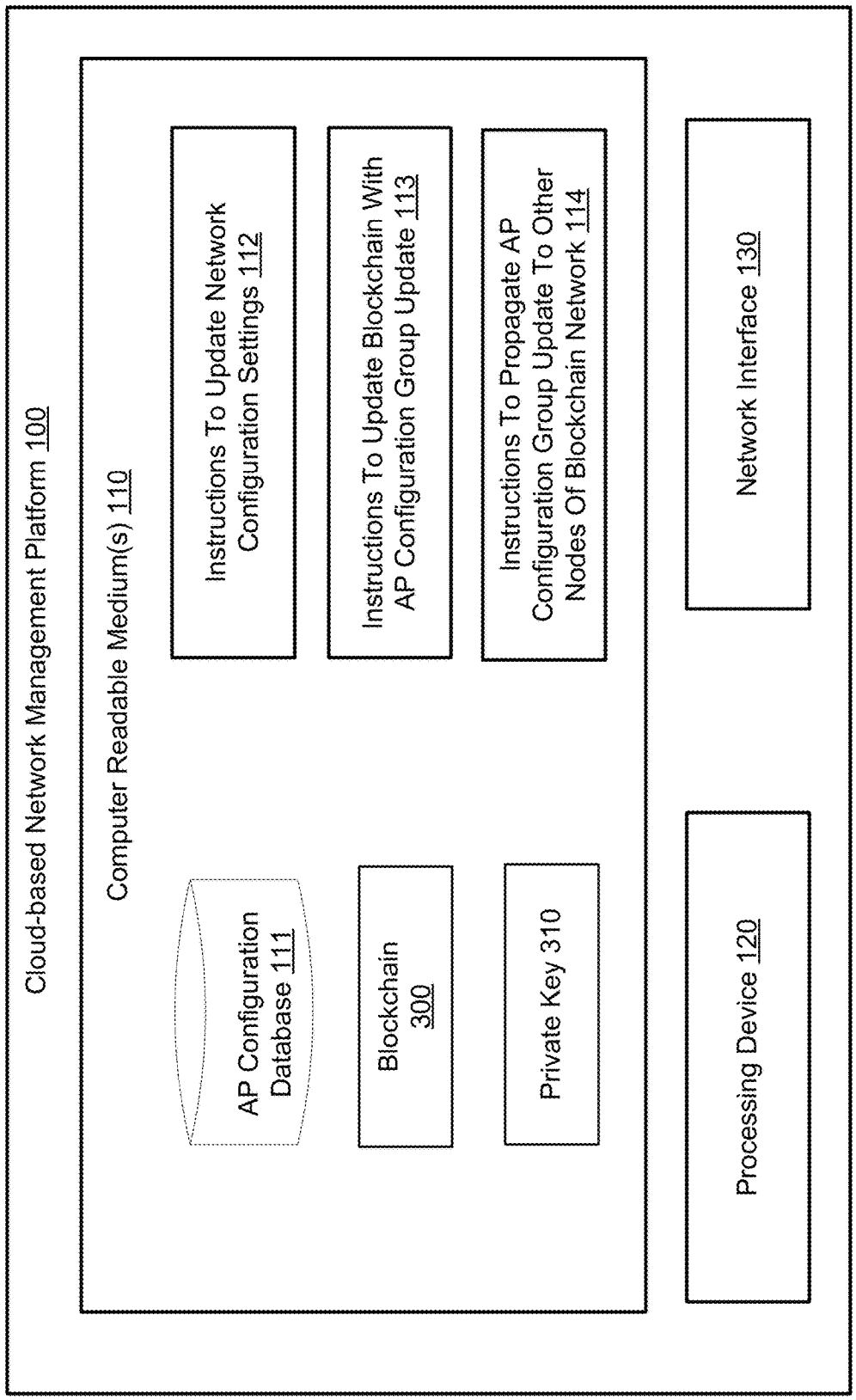
FIG. 2 is a block diagram illustrating an example architecture of components of cloud-based network management platform, in accordance with implementations of the disclosure.

FIG. 2 is a block diagram illustrating an example architecture of components of cloud-based network management platform 100, in accordance with implementations of the disclosure. Platform 100 may include one or more computer readable medium(s) 110, a processing device 120, and a network interface 130 for pushing network configuration updates to sites 10. Some non-limiting examples of communication methods that may be implemented by networked devices in accordance with the disclosure may include wired communications methods, such as cable, fiber-optic, or DSL; or wireless communications methods, such as Wi-Fi, cellular communications, or satellite communications, or some combination thereof.

The one or more computer readable medium(s) 100 may store an AP configuration database 111 associated with an enterprise, a local copy of blockchain 300, and a private key 310 associated with a blockchain address provisioned by the platform for the enterprise. For example, a blockchain address corresponding to an enterprise may be provisioned by platform 100, and a private key 310 may be derived from the provisioned blockchain address. AP configuration database 111 may maintain the aforementioned AP configuration settings, including AP group configuration settings.

The one or more computer readable medium(s) 100 may store instructions 112, that when executed by processing device 120, update a network configuration setting, including AP group configuration setting. Further, computer readable medium(s) 100 may store instructions 113, that when executed by processing device 120, update blockchain 300 with a network configuration update, including an AP and/or AP group configuration update. The one or more computer readable medium(s) 100 may further store instructions 114, that when executed by processing device 120, propagate the blockchain transaction including the AP and/or AP group configuration update to other nodes of the blockchain network (e.g., devices 200).

Figure 3:
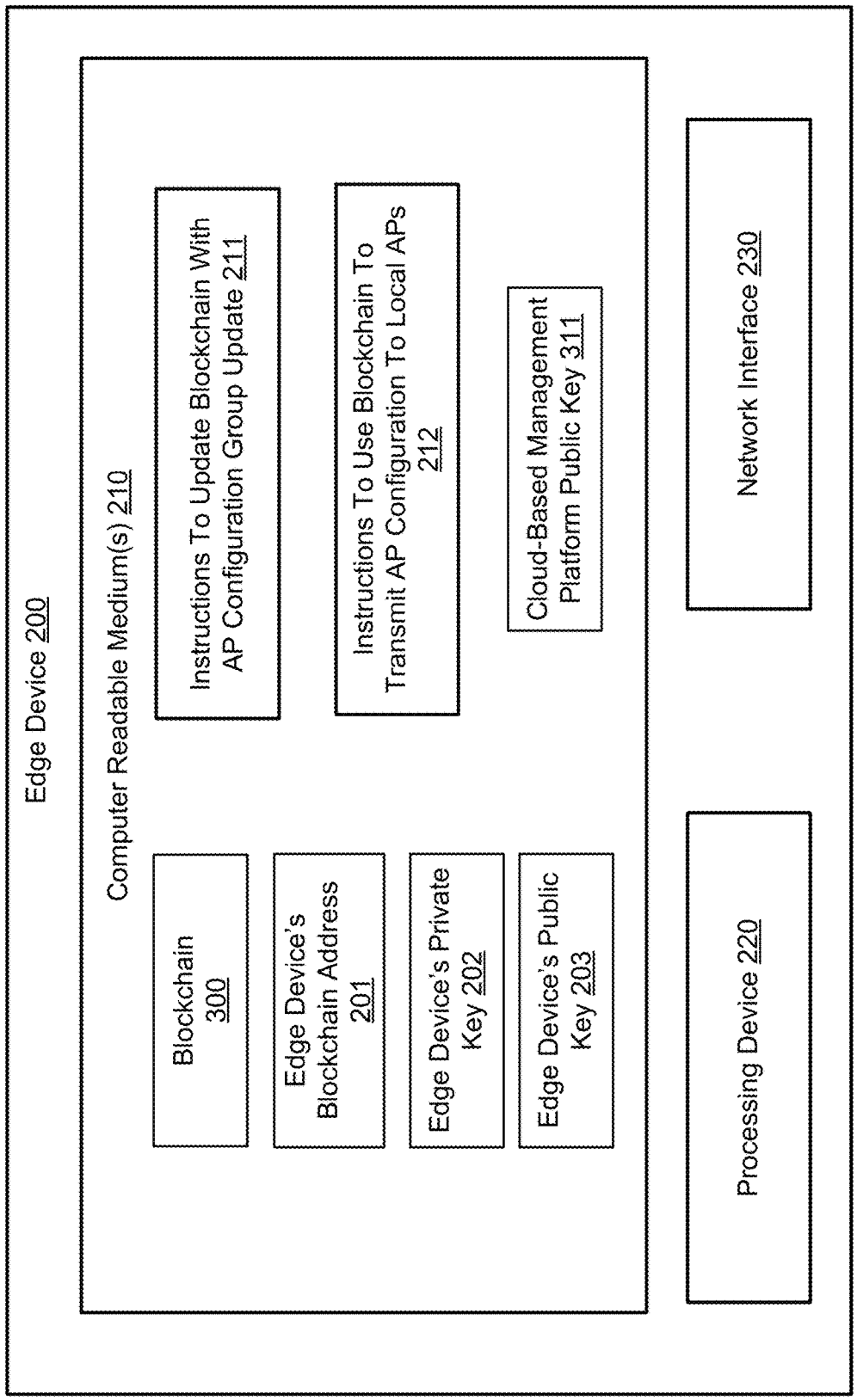
FIG. 3 is a block diagram illustrating an example architecture of components of an edge device, in accordance with implementations of the disclosure.

FIG. 3 is a block diagram illustrating an example architecture of components of an edge device 200, in accordance with implementations of the disclosure. Edge device 200 may include one or more computer readable medium(s) 210, a processing device 220, and a network interface 230 for communicating with local APs 400, cloud-based network management network platform 100, or some other device over network 75.

The one or more computer readable medium(s) 210 may store a local copy of blockchain 300, a blockchain address 201 provisioned for the edge device 200, and a private key 202 associated with blockchain address 201. For example, a private key 202 may be generated through a blockchain application, a public key 203 may be derived from the private key 202, and a blockchain address 201 may be derived from the public key 203 by applying additional cryptographic algorithm(s). In some implementations, the public key 203 and blockchain address 201 are the same.

The one or more computer readable medium(s) 210 may store instructions 211, that when executed by processing device 220, update a blockchain with an AP group configuration group update. Further, computer readable medium(s) 210 may store instructions 212, that when executed by processing device 220, use the local copy of blockchain 300 to transmit a current AP configuration to an AP. In some implementations, the current AP configuration may be transmitted to an AP that is a local AP on the same local area network as the edge device 200. Alternatively, the AP configuration may be transmitted to an AP that is not on the same local area network (e.g., geographically located in a different branch office).

Figure 4:
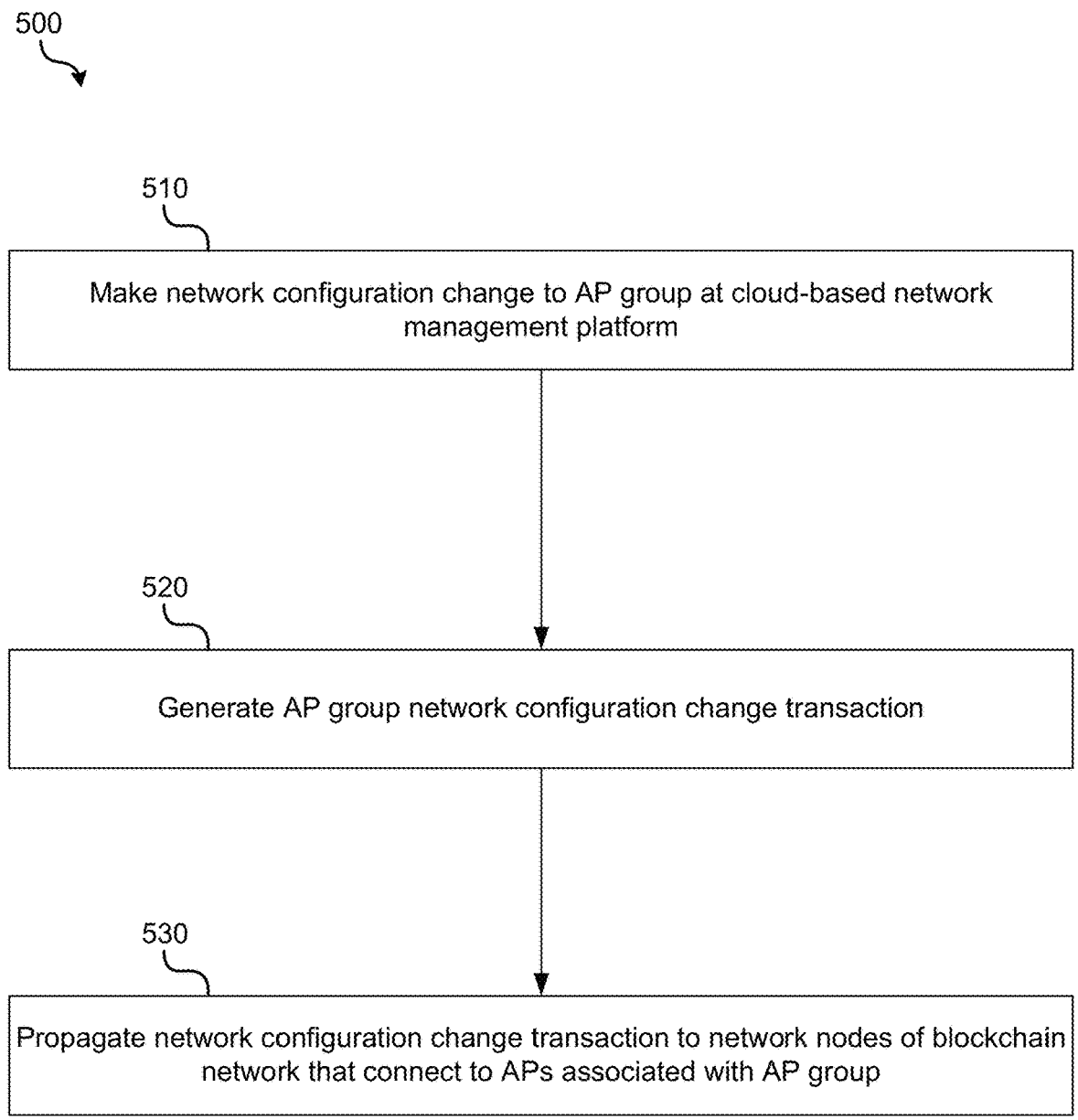
FIG. 4 is an operational flow diagram illustrating an example method that may be implemented by a cloud-based network management platform, in accordance with implementations of the disclosure.

FIG. 4 is an operational flow diagram illustrating an example method 500 that may be implemented by a cloud-based network management platform 100 in accordance with implementations of the disclosure. For example, method 500 may be implemented by a processing device 120 executing instructions 112, 113, and/or 114.

At operation 510, a change to a network configuration of an AP group is made at platform 100. For example, a networking administrator using admin workstation 30 may make configuration changes to a particular AP group using cloud-based network management platform UI 35. The update to the configuration may be stored in AP configuration database 111. At operation 520, platform 100 may generate an AP group network configuration transaction to be propagated to a blockchain network. The transaction may be signed using private key 310 of platform 100. At operation 530, the transaction is propagated to a network of nodes of the blockchain network that connect to APs associated with the AP group to which configuration changes were made. In particular, it may be propagated to a plurality of nodes, each of the plurality of nodes corresponding to a site having APs that belong to the AP group.

Figure 5:
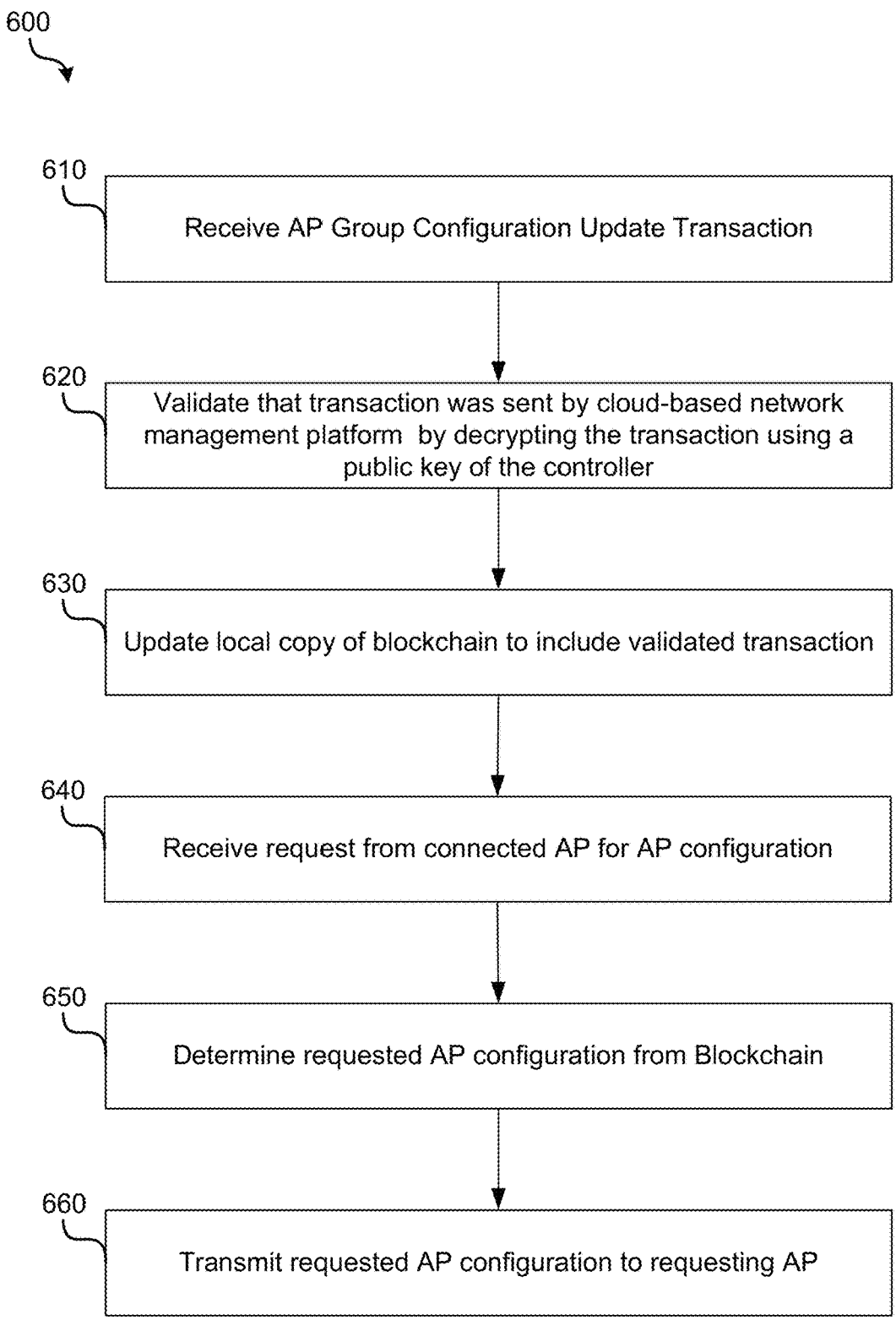
FIG. 5 is an operational flow diagram illustrating an example method that may be implemented by edge devices, in accordance with implementations of the disclosure.

FIG. 5 is an operational flow diagram illustrating an example method 600 that may be implemented by edge devices 200 in accordance with implementations of the disclosure. For example, method 600 may be implemented by a processing device 220 executing instructions 211 and 212 stored in one or more computer readable medium(s) 210. In implementations, the edge device 200 may be a gateway, an edge server, or an AP located at a particular site. As such, any one of a gateway, edge server, or AP may act as a blockchain node. As noted above, there may be multiple such nodes in any particular site 10. As such, in some instances the operations of method 600 may be implemented by the multiple nodes.

At operation 610, an AP group configuration update transaction is received by an edge device 200 over a blockchain network. The transaction may signed by platform 100 using private key 310. At operation 620, the edge device 200 validates that the transaction was sent by the cloud-based network management platform. For example, the edge device 200 may decrypt the transaction using a public key 311 of the platform 100. At operation 630, after validating the transaction, the edge device 200 may update its local copy of the blockchain 300 to include the validated transaction. For example, a new block may be added to its local copy of blockchain 300, the new block including the AP group configuration update.

Following update of the blockchain 300, edge device 200 may provide a means for APs 400 in its site to obtain the latest configuration data, even in instances when platform 100 is inaccessible.

To this end, assume that APs 400 cannot communicate with platform 100 for some reason. The APs may still check with the nearest blockchain node that is reachable and update the networking configuration. Because only valid changes to configurations made by the platform 100 may be added to the blockchain 300 in such implementations, this may provide a secure and tamper-proof way of ensuring that configurations in the APs are exactly as they are intended to be. As such, An AP 400 that has its configurations lost or corrupted may update it from the nearest reachable blockchain node. Moreover, the APs may periodically check with the blockchain nodes (e.g., edge devices 200) as to whether their configurations are accurate. For example, in some implementations, no APs may be allowed to have a configuration at variance with the latest block in the blockchain. Moreover, even if there is an accidental misconfiguration, it may be possible to revert to a particular previous configuration because the blockchain may have a time-stamped ledger of running configuration stored in it, and given the day and time to which a reversion is needed, the nodes may read the data from the blockchain and update.

Referring again to method 600, at operation 640, a request may be received from a connected AP 400 for a current or previous AP configuration. In some implementations, the request may be for an AP group configuration associated with an AP group that the AP 400 belongs to. The requesting AP may be an AP that needs the updated configuration or an AP that is trying to revert to a previous configuration at a particular point in time (e.g., for recovery purposes after a crash or misconfiguration). The requesting AP 400 may query for an available edge device 200 asking for either the current configuration or the configuration at some prior point in time. The edge device may then send this requested configuration to the AP.

In some implementations, the AP may periodically query or poll a blockchain node running in an edge device 200 to determine whether it has the same configuration as the latest block in the edge device 200. In some implementations, if the AP discovers that platform 100 is unreachable for obtaining the latest configuration, the AP may query a blockchain node running in an edge device 200 for the latest configuration. In some implementations, the AP may query a blockchain node running in an edge device 200 for the latest configuration as part of a restoration process (e.g., after the AP crashes and/or loses its configuration settings because of some form of hardware or software failure).

In the aforementioned examples, the AP may be configured to query the nearest edge device (e.g., in terms of fast and reliable connectivity) to retrieve the configuration from a blockchain. The AP may query for the same configuration settings that are usually pushed to the APs by the cloud-based network management platform 100, including, for example, RF parameters, transmit power, VLAN configurations, firewall, roles, policies, SSIDs, etc.

At operation 650, the edge device 200 may determine the requested configuration by reading its local copy of the blockchain 300. For example, the edge device 200 may read the configuration from the latest block in the blockchain 300.

At operation 660, the requested AP configuration may be transmitted to the requesting AP. Once the AP receives a response to the query from the edge device, the AP may configure itself with the configuration settings from the query response.

In some implementations, an edge device 200 may be configured to transmit a deny message in response to a request received for an AP configuration. For example, if a network security breach is suspected (e.g., a third party is spoofing an AP), or if for some reason it is preferable for the AP to maintain the last configuration setting it received from a cloud-based controller, the request may be denied.

It should be noted that although implementations of the disclosure have been described primarily in the context of making and maintaining AP group configuration updates using a distributed ledger network, the techniques described herein may more generally be applied to make and maintain networking device group configuration updates. For example, to the extent that network configuration parameters are applied to a logical group of networking devices that maintain the same state, including logical groupings of devices that may be geographically distributed in multiple locations, the techniques described herein may be implemented.

For example, in SDWAN configurations, the techniques described herein may be applied to a group of branch/site controllers. These SDWAN branch controllers may be across different geographies. The techniques described herein may also be applied to logical groups of layer 2 switches in a building, to IoT device groups in an industrial or other setting, or some other group of networking devices that may be controlled and/or configured from a single location (e.g., using a cloud-based controller that makes updates to group configuration settings, and pushes those updates to the devices through edge network devices).

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory computer readable medium having instructions stored thereon, that when executed by a processor, performs operations of:
   receiving over a distributed ledger network, at an edge network device, a network configuration update transaction,
      wherein the network configuration update transaction includes an update to a configuration setting of a network device group,
      wherein the network device group comprises a plurality of network devices, and wherein the edge network device is communicatively coupled to one or more of the plurality of network devices;
determining, at the edge network device, a failure in a communication link to a centralized cloud-based networking management platform;
validating, at the edge network device, that the network configuration update transaction was sent by the centralized cloud-based networking management platform,
wherein the centralized cloud-based networking management platform manages configurations of the plurality of network devices, and
wherein the plurality of network devices are members of the network device group;
after validating the network configuration update transaction, receiving, at the edge network device, a local copy of a distributed ledger associated with the distributed ledger network to include the update to the network configuration update transaction; and
initiating the update of the configuration setting of the network device group using the local copy.

2. The non-transitory computer readable medium of claim 1, wherein the validation is made by decrypting the network configuration update transaction using a public key associated with the centralized cloud-based networking management platform.

3. The non-transitory computer readable medium of claim 1, wherein the instructions, when executed by the processor, further perform operations of:
receiving a request at the edge network device from one of the plurality of network devices of the network device group for a current configuration setting of the requesting network device;
retrieving the current configuration setting of the requesting network device from the updated local copy of the distributed ledger; and
transmitting the retrieved configuration setting from the edge network device to the requesting networked device.

4. The non-transitory computer readable medium of claim 3,
wherein retrieving the current configuration setting of the requesting network device from the updated local copy of the distributed ledger comprises retrieving the configuration setting from the distributed ledger, and
wherein transmitting the retrieved network configuration setting from the edge network device to the requesting network device comprises transmitting the retrieved network device group configuration setting to the requesting network device.

5. The non-transitory computer readable medium of claim 3, wherein the edge network device is a gateway, an edge server, or an access point.

6. The non-transitory computer readable medium of claim 3,
wherein the distributed ledger is a blockchain, and
wherein retrieving the current configuration setting of the network device from the updated local copy of the distributed ledger comprises reading the current configuration setting from a block most recently added to the blockchain.

7. The non-transitory computer readable medium of claim 3, wherein the network device group is a group of a plurality of access points, a plurality of controllers, a plurality of layer 2 switches, or a plurality of internet of things (IoT) devices.

8. The non-transitory computer readable medium of claim 7,
wherein the network device group is a group of a plurality of access points, and
wherein the update to the network device group configuration comprises an update to one or more of access point group security settings and access point group radio settings.

9. The non-transitory computer readable medium of claim 8, wherein the plurality of access points of the access point group are geographically distributed in at least two different locations.

10. A method, comprising:
receiving over a distributed ledger network, at an edge network device, a network configuration update transaction,
wherein the network configuration update transaction includes an update to a configuration setting of a network device group,
wherein the network device group comprises a plurality of network devices, and
wherein the edge network device is communicatively coupled to one or more of the plurality of network devices;
determining, at the edge network device, a failure in a communication link to a centralized cloud-based networking management platform;
validating, at the edge network device, that the network configuration update transaction was sent by the centralized cloud-based networking management platform,
wherein the centralized cloud-based networking management platform manages configurations of network devices, and
wherein the plurality of network devices are members of the network device group; and
after validating the network configuration update transaction, receiving, at the edge network device, a local copy of a distributed ledger associated with the distributed ledger network to include the update to the network configuration update transaction; and
initiating the update of the configuration setting of the network device group using the local copy.

11. The method of claim 10, wherein the validation is made by decrypting the transaction using a public key associated with the centralized cloud-based networking management platform.

12. The method of claim 10, further comprising:
receiving a request at the edge network device from a network device of the group for a current configuration setting of the requesting network device;
retrieving the current configuration setting of the requesting network device from the updated local copy of the distributed ledger; and
transmitting the retrieved configuration setting from the edge network device to the requesting network device.

13. The method of claim 12,
wherein the distributed ledger is a blockchain, and
wherein retrieving the current configuration setting from the updated local copy of the distributed ledger comprises reading the current configuration setting from a block most recently added to the blockchain.

14. The method of claim 10,
wherein the update to the configuration of the network device group comprises an update to an access point group configuration of a plurality of access points, and
wherein the update to the access point group configuration comprises an update to one or more of access point group security settings and access point group radio settings.

15. The method of claim 10, further comprising:
making the update to the configuration of the network device group at the cloud-based networking management platform;
generating the network configuration update transaction at the cloud-based networking management platform; and
propagating, over the distributed ledger network, the transaction from the cloud-based networking management platform to each of a plurality of edge network devices, wherein each of the plurality of edge network devices is communicatively coupled to one or more of the plurality of network devices of the network device group.

16. The method of claim 15, wherein the plurality of edge network devices are geographically distributed.

17. The method of claim 15, wherein making the update to the configuration of the network device group comprises storing the update at a database maintained by the cloud-based networking management platform.

18. The method of claim 10, wherein the plurality of network devices of the group are geographically distributed in at least two different locations.

19. The method of claim 18, wherein the edge network device is a gateway, an edge server, or an access point.

20. A system, comprising:
a processor;
a non-transitory computer readable medium having instructions stored thereon, that when executed by the processor, performs operations of:
receiving over a distributed ledger network, at an edge network device, a network configuration update transaction,
wherein the network configuration update transaction includes an update to a configuration setting of a network device group,
wherein the network device group comprises a plurality of network devices, and
wherein the edge network device is communicatively coupled to one or more of the plurality of network devices;
determining, at the edge network device, a failure in a communication link to a centralized cloud-based networking management platform;
validating, at the edge network device, that the network configuration update transaction was sent by the centralized cloud-based networking management platform,
wherein the centralized cloud-based networking management platform manages configurations of the plurality of network devices, and
wherein the plurality of network devices are members of the network device group;
after validating the network configuration update transaction, receiving, at the edge network device, a local copy of a distributed ledger associated with the distributed ledger network to include the update to the network configuration update transaction; and
initiating the update of the configuration setting of the network device group using the local copy.

* * * * *